US012559578B2

(12) United States Patent
Imai et al.

(10) Patent No.: US 12,559,578 B2
(45) Date of Patent: Feb. 24, 2026

(54) FIBROUS CELLULOSE, FIBROUS CELLULOSE COMPOSITE RESIN, AND METHOD FOR MANUFACTURING FIBROUS CELLULOSE

(71) Applicant: DAIO PAPER CORPORATION, Ehime (JP)

(72) Inventors: Takaaki Imai, Ehime (JP); Yu Ochiai, Ehime (JP)

(73) Assignee: Daio Paper Corporation, Ehime (JP)

( * ) Notice: Subject to any disclaimer, the term of this patent is extended or adjusted under 35 U.S.C. 154(b) by 593 days.

(21) Appl. No.: 17/913,945

(22) PCT Filed: Mar. 11, 2021

(86) PCT No.: PCT/JP2021/009887

§ 371 (c)(1),
(2) Date: Sep. 23, 2022

(87) PCT Pub. No.: WO2021/193119

PCT Pub. Date: Sep. 30, 2021

(65) Prior Publication Data

US 2023/0159665 A1 May 25, 2023

(30) Foreign Application Priority Data

Mar. 26, 2020 (JP) ................................ 2020-056513

(51) Int. Cl.

| | |
|---|---|
| ***C08B 15/06*** | (2006.01) |
| ***C08B 3/20*** | (2006.01) |
| ***C08B 3/24*** | (2006.01) |
| ***C08L 1/02*** | (2006.01) |
| ***C08L 1/08*** | (2006.01) |
| ***C08L 23/12*** | (2006.01) |
| ***C08L 101/00*** | (2006.01) |
| ***D21C 9/00*** | (2006.01) |
| ***D21H 11/20*** | (2006.01) |

(52) U.S. Cl.

CPC ................ *C08B 15/06* (2013.01); *C08B 3/20* (2013.01); *C08B 3/24* (2013.01); *C08L 1/02* (2013.01); *C08L 1/08* (2013.01); *C08L 23/12* (2013.01); *C08L 101/00* (2013.01); *D21C 9/007* (2013.01); *D21H 11/20* (2013.01)

(58) Field of Classification Search

CPC .. C08B 15/06; C08B 3/20; C08B 3/24; C08L 1/08; C08L 23/12; C08L 1/02; C08L 101/00; D21C 9/007; D21H 11/20

See application file for complete search history.

(56) References Cited

U.S. PATENT DOCUMENTS

| | | | |
|---|---|---|---|
| 2020/0115471 | A1 | 4/2020 | Tsujii et al. |
| 2021/0380724 | A1 | 12/2021 | Matsusue |

FOREIGN PATENT DOCUMENTS

| | | | |
|---|---|---|---|
| JP | 2018-048235 | | 3/2018 |
| JP | 2018-048237 | | 3/2018 |
| JP | 2018-090738 | | 6/2018 |
| JP | 2018-100474 | | 6/2018 |
| JP | 2019-001876 | | 1/2019 |
| JP | 2019-199671 | | 11/2019 |
| JP | 2021-031662 | | 3/2021 |
| JP | 2021155545 | A | 10/2021 |
| KR | 20200019687 | A | 2/2020 |
| WO | 2018/212012 | | 11/2018 |
| WO | 2020/203147 | | 10/2020 |

OTHER PUBLICATIONS

International Search Report for PCT/JP2021/009887, dated Apr. 20, 2021.

Office Action for Korean Patent Appl. No. 10-2022-7028155, dated Jan. 12, 2026.

*Primary Examiner* — Patrick D Niland

(74) *Attorney, Agent, or Firm* — Andrus Intellectual Property Law, LLP

(57) ABSTRACT

A fibrous cellulose has an average fiber width of 0.1 μm or more and has a part or all of hydroxyl groups replaced with carbamate groups, in which a replacement ratio with the carbamate group is 1.0 mmol/g or more, and a fine ratio is 30% or more. A fibrous cellulose composite resin contains a fibrous cellulose and a resin, and the above fibrous cellulose In manufacturing fibrous cellulose, a cellulose raw material and urea or the like are subjected to a heat treatment to replace a part or all of hydroxyl groups of the cellulose raw material with carbamate groups, defibration is performed within a range in which an average fiber width is 0.1 μm or more, the heat treatment is performed such that a replacement ratio with the carbamate group is 1.0 mmol/g or more, and the defibration is performed until a fine ratio reaches 30% or more.

8 Claims, No Drawings

FIBROUS CELLULOSE, FIBROUS CELLULOSE COMPOSITE RESIN, AND METHOD FOR MANUFACTURING FIBROUS CELLULOSE

CROSS-REFERENCE TO RELATED APPLICATIONS

This application is the U.S. national stage application of International Application PCT/JP2021/009887, filed Mar. 11, 2021, which international application was published on Sep. 30, 2021, as International Publication WO 2021/193119 in the Japanese language. The International Application claims priority of Japanese Patent Application No. 2020-056513, filed Mar. 26, 2020. The international application and Japanese application are both incorporated herein by reference, in entirety.

TECHNICAL FIELD

The present invention relates to a fibrous cellulose, a fibrous cellulose composite resin, and a method for manufacturing the fibrous cellulose.

BACKGROUND ART

In recent years, use of fine fibers such as cellulose nanofibers or a microfiber cellulose (microfibrillated cellulose) as a reinforcing material for resin has attracted attention. However, while the fine fibers are hydrophilic, the resin is hydrophobic. Therefore, when the fine fibers are used as a reinforcing material for resin, there is a problem in dispersibility of the fine fibers. Therefore, the present inventors proposed to replace a hydroxy group of the fine fibers with a carbamate group (see Patent Literature 1). According to this proposal, the dispersibility of the fine fibers is improved, and therefore a resin reinforcing effect is improved. However, even at present, it is desired to further improve the reinforcing effect, and various studies have been continued.

CITATION LIST

Patent Literature

Patent Literature 1: JP 2019-1876 A

SUMMARY OF INVENTION

Technical Problem

A main problem to be solved by the invention is to provide a fibrous cellulose having a high resin reinforcing effect, a fibrous cellulose composite resin having high strength, and a method for manufacturing the fibrous cellulose having a high resin reinforcing effect.

Solution to Problem

In conventional development, for example, in development of the above Patent Literature, a main focus is placed on modification of fine fibers, and among many modification methods such as esterification, etherification, amidation, and sulfidation, it has been found that introduction of a carbamate group (carbamation) is excellent. On the other hand, the present invention does not focus on the introduction of a carbamate group, and has found and reached that the above problem can be solved by analyzing a resin reinforcing effect in detail and pursuing physical properties of fine fibers while a large number of tests are performed on the premise of the introduction of a carbamate group. More specifically, one cause of an insufficient resin reinforcing effect is breakage of a resin, and the breakage of the resin occurs from an inhomogeneous portion present in the resin. In order to eliminate the inhomogeneity of the resin, aiming at improving dispersibility of the fine fibers is one reasonable solution, and this point has largely advanced by the introduction of a carbamate group. However, it has also been found that the more heterogeneous fibers are contained, the more easily the breakage of the resin proceeds, and the following means have been reached through such a finding.

Means Recited in Claim 1

A fibrous cellulose having an average fiber width of 0.1 μm or more and having a part or all of hydroxyl groups replaced with carbamate groups, wherein a replacement ratio with the carbamate group is 1.0 mmol/g or more, and a fine ratio is 30% or more.

Means Recited in Claim 2

The fibrous cellulose recited in claim 1, having an average fiber length of 0.10 to 2.00 mm.

Means Recited in Claim 3

The fibrous cellulose recited in claim 1 or 2, wherein a cellulose raw material serving as a raw material has a fine ratio of 1% or more.

Means Recited in Claim 4

A fibrous cellulose composite resin including a fibrous cellulose and a resin, wherein the fibrous cellulose has an average fiber width of 0.1 μm or more and has a part or all of hydroxyl groups replaced with carbamate groups, a replacement ratio with the carbamate group is 1.0 mmol/g or more, and a fine ratio is 30% or more.

Means Recited in Claim 5

The fibrous cellulose composite resin recited in claim 4, wherein a standard deviation of flexural modulus measured in accordance with JIS K 7171 is 30 MPa or less.

Means Recited in Claim 6

A method for manufacturing a fibrous cellulose, the method including:

subjecting a cellulose raw material and at least one of urea and a derivative of urea to a heat treatment to replace a part or all of hydroxyl groups of the cellulose raw material with carbamate groups; and defibrating the cellulose raw material within a range in which an average fiber width is 0.1 μm or more, wherein the heat treatment is performed such that a replacement ratio with the carbamate group is 1.0 mmol/g or more, and the defibration is performed until a fine ratio reaches 30% or more.

Advantageous Effects of Invention

The invention provides a fibrous cellulose having a high resin reinforcing effect, a fibrous cellulose composite resin having high strength, and a method for manufacturing the fibrous cellulose having a high resin reinforcing effect.

DESCRIPTION OF EMBODIMENTS

Next, an embodiment for carrying out the invention will be described. Note that the present embodiment is an example of the present invention. The scope of the present invention is not limited to the scope of the present embodiment.

A fibrous cellulose (hereinafter, also referred to as "cellulose fibers") of the present embodiment has an average fiber width (diameter) of 0.1 μm or more, and has a part or all of hydroxyl groups (—OH groups) replaced with carbamate groups. In addition, the fibrous cellulose has a replacement ratio with the carbamate group of 1.0 mmol/g or more, and a fine ratio of 30% or more. By including the fibrous cellulose and a resin, a fibrous cellulose composite resin is formed. Furthermore, a method for manufacturing the fibrous cellulose includes: a step of subjecting a cellulose raw material and at least one of urea and a derivative of urea to a heat treatment to replace a part or all of hydroxy groups of the cellulose raw material with carbamate groups; and a step of defibrating the cellulose raw material within a range in which an average fiber width is 0.1 μm or more to obtain a microfiber cellulose. The heat treatment is performed such that a replacement ratio with the carbamate group is 1.0 mmol/g or more, and the defibration is performed until a fine ratio reaches 30% or more. Details will be described below.

(Fibrous Cellulose)

A fibrous cellulose composite resin of the present embodiment contains a fibrous cellulose (hereinafter, also referred to as "cellulose fibers") and a resin, and preferably further contains an acid-modified resin. When the fibrous cellulose composite resin contains an acid-modified resin, a part or all of the carbamate groups are ionically bonded to acid groups of the acid-modified resin.

In the present embodiment, the fibrous cellulose formed of fine fibers is a microfiber cellulose (microfibrillated cellulose) having an average fiber diameter of 0.1 μm or more. When the fibrous cellulose is a microfiber cellulose, a resin reinforcing effect is significantly improved. In addition, the microfiber cellulose is more easily modified with a carbamate group (carbamated) than cellulose nanofibers, which are also fine fibers. However, it is more preferable to carbamate a cellulose raw material before making the cellulose raw material finer, and in this case, the microfiber cellulose is equivalent to the cellulose nanofibers.

In the present embodiment, the microfiber cellulose means fibers having a larger average fiber width than the cellulose nanofibers. Specifically, the average fiber diameter is, for example, 0.1 to 20 μm, preferably 0.2 to 19 μm, and more preferably more than 0.5 to 18 μm. When the average fiber diameter of the microfiber cellulose is less than 0.1 μm, the microfiber cellulose is not different from the cellulose nanofibers, and there is a possibility that an effect of improving strength (particularly flexural modulus) of a resin cannot be sufficiently obtained. In addition, defibration time is long, and a large amount of energy is required. Furthermore, a dehydration property of a cellulose fiber slurry deteriorates. When the dehydration property deteriorates, a large amount of energy is required for drying, and by applying a large amount of energy for drying, the microfiber cellulose may be thermally deteriorated to lower strength thereof. Meanwhile, when the average fiber diameter of the microfiber cellulose exceeds 20 μm, the microfiber cellulose is not different from pulp, and there is a possibility that the reinforcing effect is not sufficient.

The microfiber cellulose can be obtained by defibrating a cellulose raw material (hereinafter, also referred to as "raw material pulp") (making the cellulose raw material finer). As the raw material pulp, for example, one or more kinds selected from the group consisting of a wood pulp made from hardwood, softwood, or the like, a non-wood pulp made from straw, bagasse, cotton, hemp, bast fibers, or the like, and a de-inked pulp (DIP) made from recovered used paper, waste paper, or the like can be used. Note that the above various raw materials may be, for example, in a state of a pulverized product (powdered product) called a cellulose-based powder or the like.

However, as the raw material pulp, a wood pulp is preferably used in order to avoid contamination with impurities as much as possible. As the wood pulp, for example, one or more kinds selected from the group consisting of a chemical pulp such as a hardwood kraft pulp (LKP) or a softwood kraft pulp (NKP), and a mechanical pulp (TMP) can be used.

The hardwood kraft pulp may be a hardwood bleached kraft pulp, a hardwood unbleached kraft pulp, or a hardwood semi-bleached kraft pulp. Similarly, the softwood kraft pulp may be a softwood bleached kraft pulp, a softwood unbleached kraft pulp, or a softwood semi-bleached kraft pulp.

As the mechanical pulp, for example, one or more kinds selected from the group consisting of a stone ground pulp (SGP), a pressure stone ground pulp (PGW), a refiner ground pulp (RGP), a chemiground pulp (CGP), a thermoground pulp (TGP), a ground pulp (GP), a thermomechanical pulp (TMP), a chemithermomechanical pulp (CTMP), a refiner mechanical pulp (RMP), and a bleached thermomechanical pulp (BTMP) can be used.

The raw material pulp can be pretreated by a chemical method prior to defibration. Examples of the pretreatment by a chemical method include hydrolysis of a polysaccharide by an acid (acid treatment), hydrolysis of a polysaccharide by an enzyme (enzyme treatment), swelling of a polysaccharide by an alkali (alkali treatment), oxidation of a polysaccharide by an oxidizing agent (oxidation treatment), and reduction of a polysaccharide by a reducing agent (reduction treatment). However, as the pretreatment by a chemical method, the enzyme treatment is preferably performed, and one or more treatments selected from the acid treatment, the alkali treatment, and the oxidation treatment are more preferably performed. Hereinafter, details of the enzyme treatment will be described.

As an enzyme used for the enzyme treatment, at least one of a cellulase enzyme and a hemicellulase enzyme is preferably used, and both of these enzymes are more preferably used together. Use of these enzymes makes defibration of the cellulose raw material easier. Note that the cellulase enzyme causes decomposition of cellulose in the presence of water. The hemicellulase enzyme causes decomposition of hemicellulose in the presence of water.

Examples of the cellulase enzyme include enzymes that produce *Trichoderma* (filamentous fungus), *Acremonium* (filamentous fungus), *Aspergillus* (filamentous fungus), *Phanerochaete* (basidiomycete), *Trametes* (basidiomycete),

*Humicola* (filamentous fungus), *Bacillus* (bacterium), *Schizophyllum* (basidiomycete), *Streptomyces* (bacterium), and *Pseudomonas* (bacterium). These cellulase enzymes can be purchased as reagents or commercially available products. Examples of the commercially available products include Celluloisin T2 (manufactured by HPI Inc.), Meicelase (manufactured by Meiji Seika Pharma Co., Ltd.), Novozyme 188 (manufactured by Novozymes), Multifect CX10L (manufactured by Genencor Corp.), and cellulase enzyme GC220 (manufactured by Genencor Corp.).

In addition, as the cellulase enzyme, either endoglucanase (EG) or cellobiohydrolase (CBH) can also be used. EG and CBH may be used singly or as a mixture thereof. In addition, EG and CBH may be mixed with a hemicellulase enzyme to be used.

Examples of the hemicellulase enzyme include xylanase as an enzyme that decomposes xylan, mannase as an enzyme that decomposes mannan, and arabanase as an enzyme that decomposes araban. Pectinase as an enzyme that decomposes pectin can also be used.

Hemicellulose is a polysaccharide excluding pectins present between cellulose microfibrils in a plant cell wall. Hemicellulose is diverse and differs depending on the kind of wood and a cell wall layer. Glucomannan is a main component on a secondary wall of softwood, and 4-O-methylglucuronoxylan is a main component on a secondary wall of hardwood. Therefore, when fine fibers are obtained from a softwood bleached kraft pulp (NBKP), mannase is preferably used. When fine fibers are obtained from a hardwood bleached kraft pulp (LBKP), xylanase is preferably used.

The addition amount of an enzyme to the cellulose raw material depends on, for example, the kind of the enzyme, the kind of wood serving as a raw material (softwood or hardwood), or the kind of mechanical pulp. However, the addition amount of an enzyme to the cellulose raw material is preferably 0.1 to 3% by mass, more preferably 0.3 to 2.5% by mass, and particularly preferably 0.5 to 2% by mass. When the addition amount of an enzyme is less than 0.1% by mass, there is a possibility that an effect of addition of the enzyme cannot be sufficiently obtained. Meanwhile, when the addition amount of an enzyme exceeds 3% by mass, cellulose is saccharified, and the yield of the fine fibers may decrease. In addition, there is also a problem that improvement of the effect corresponding to an increase in the addition amount cannot be recognized.

When a cellulase enzyme is used as the enzyme, the pH during the enzyme treatment is preferably within a weakly acidic region (pH=3.0 to 6.9) from a viewpoint of reactivity of an enzyme reaction. Meanwhile, when a hemicellulase enzyme is used as the enzyme, the pH during the enzyme treatment is preferably within a weakly alkaline region (pH=7.1 to 10.0).

The temperature during the enzyme treatment is preferably 30 to 70° C., more preferably 35 to 65° C., and particularly preferably 40 to 60° C., regardless of whether a cellulase enzyme or a hemicellulase enzyme is used as the enzyme. When the temperature during the enzyme treatment is 30° C. or higher, enzyme activity hardly decreases, and prolongation of treatment time can be prevented. Meanwhile, when the temperature during the enzyme treatment is 70° C. or lower, inactivation of the enzyme can be prevented.

The time of the enzyme treatment depends on, for example, the kind of enzyme, the temperature of the enzyme treatment, or the pH during the enzyme treatment. However, in general, the time of the enzyme treatment is 0.5 to 24 hours.

After the enzyme treatment, the enzyme is preferably inactivated. Examples of a method for inactivating the enzyme include a method for adding an alkaline aqueous solution (preferably having a pH of 10 or more, more preferably a pH of 11 or more) and a method for adding hot water at 80 to 100° C.

Next, a method of the alkali treatment will be described.

By performing the alkali treatment prior to the defibration, a part of hydroxy groups of a hemicellulose or a cellulose included in the pulp is dissociated, and molecules are anionized to weaken intramolecular and intermolecular hydrogen bonding, resulting in promoting dispersion of the cellulose raw material in the defibration.

As an alkali used for the alkali treatment, for example, sodium hydroxide, lithium hydroxide, potassium hydroxide, an aqueous ammonia solution, or an organic alkali such as tetramethylammonium hydroxide, tetraethylammonium hydroxide, tetrabutylammonium hydroxide, or benzyltrimethylammonium hydroxide can be used. However, sodium hydroxide is preferably used from a viewpoint of manufacturing cost.

When an enzyme treatment, an acid treatment, or an oxidation treatment is performed prior to the defibration, a water retention degree of the microfiber cellulose can be lowered, the degree of crystallinity can be increased, and homogeneity can be increased. In this regard, when the water retention degree of the microfiber cellulose is low, the microfiber cellulose is easily dehydrated, and a dehydration property of a cellulose fiber slurry is improved.

When the raw material pulp is subjected to an enzyme treatment, an acid treatment, or an oxidation treatment, an amorphous region of a hemicellulose or a cellulose included in the pulp is decomposed. As a result, energy for defibration can be reduced, and uniformity and dispersibility of the cellulose fibers can be improved. However, since the pretreatment decreases an aspect ratio of the microfiber cellulose, it is preferable to avoid excessive pretreatment when the microfiber cellulose is used as a reinforcing material for resin.

The defibration of the raw material pulp can be performed by beating the raw material pulp using, for example, a beater, a homogenizer such as a high-pressure homogenizer or a high-pressure homogenizing apparatus, a millstone friction machine such as a grinder or a mill, a single-screw kneader, a multi-screw kneader, a kneader refiner, or a jet mill. However, the defibration is preferably performed using a refiner or a jet mill.

The average fiber length (average length of single fibers) of the microfiber cellulose is preferably 0.10 to 2.00 mm, more preferably 0.12 to 1.50 mm, and particularly preferably 0.15 to 1.00 mm. When the average fiber length is less than 0.10 mm, a three-dimensional network of fibers cannot be formed, and flexural modulus or the like of the composite resin may decrease, and even if homogeneity is improved by setting the fine ratio to 35% or more, there is a possibility that the reinforcing effect is not improved. Meanwhile, when the average fiber length exceeds 2.00 mm, the reinforcing effect may be insufficient because the length is not different from that of the raw material pulp.

The cellulose raw material serving as a raw material of the microfiber cellulose has an average fiber length of preferably 0.50 to 5.00 mm, more preferably 1.00 to 3.00 mm, particularly preferably 1.50 to 2.50 mm. When the average fiber length of the cellulose raw material is less than 0.50 mm, there is a possibility that the resin reinforcing effect cannot be sufficiently obtained when defibration is performed. Meanwhile, when the average fiber length exceeds 5.00 mm, it may be disadvantageous in terms of manufacturing cost at the time of defibration.

The average fiber length of the microfiber cellulose can be arbitrarily adjusted by, for example, selection, a pretreatment, or defibration of a raw material pulp.

The fine ratio of the microfiber cellulose is preferably 30% or more, more preferably 35 to 99%, and particularly preferably 40 to 95%. When the fine ratio is 30% or more, a ratio of homogeneous fibers is large, and breakage of the composite resin hardly proceeds. However, when the fine ratio exceeds 99%, flexural modulus may be insufficient.

The above fine ratio is the fine ratio of the microfiber cellulose, but it is more preferable to set a fine ratio of a cellulose raw material serving as a raw material of the microfiber cellulose within a predetermined range. Specifically, the fine ratio of the cellulose raw material serving as a raw material of the microfiber cellulose is preferably 1% or more, more preferably 3 to 20%, and particularly preferably 5 to 18%. When the fine ratio of the cellulose raw material before defibration is within the above range, even if defibration is performed such that the fine ratio of the microfiber cellulose is 30% or more, the fibers are less damaged, and the resin reinforcing effect is considered to be improved.

The fine ratio can be adjusted by a pretreatment such as an enzyme treatment. However, particularly when the enzyme treatment is performed, there is a possibility that the fibers themselves are broken and the resin reinforcing effect decreases. Therefore, an addition amount of an enzyme from this viewpoint is preferably 2% by mass or less, more preferably 1% by mass or less, and particularly preferably 0.5% by mass or less. In addition, one option is that the enzyme treatment is not performed (addition amount is 0% by mass).

In the present embodiment, the "fine ratio" refers to a ratio based on the mass of pulp fibers each having a fiber length of 0.2 mm or less.

The microfiber cellulose has an aspect ratio of preferably 2 to 15,000, more preferably 10 to 10,000. When the aspect ratio is less than 2, a three-dimensional network cannot be sufficiently constructed, and therefore the reinforcing effect may be insufficient even if the average fiber length is 0.10 mm or more. Meanwhile, when the aspect ratio exceeds 15,000, entanglement among the molecules of the microfiber cellulose increases, and dispersion in a resin may be insufficient.

The microfiber cellulose has a percentage of fibrillation of preferably 1.0 to 30.0%, more preferably 1.5 to 20.0%, particularly preferably 2.0 to 15.0%. When the percentage of fibrillation exceeds 30.0%, a contact area with water is too large, and therefore dehydration may be difficult even if the defibration is performed within a range in which the average fiber width is 0.1 μm or more. Meanwhile, when the percentage of fibrillation is less than 1.0%, there are few hydrogen bonds between fibrils, and there is a possibility that a strong three-dimensional network cannot be formed.

In the present embodiment, the percentage of fibrillation is a value obtained by disintegrating cellulose fibers in accordance with JIS-P-8220:2012 "Pulp-Disintegration Method" and measuring the obtained disintegrated pulp using FiberLab (Kajaani).

The microfiber cellulose has a degree of crystallinity of preferably 50% or more, more preferably 55% or more, particularly preferably 60% or more. When the degree of crystallinity is less than 50%, mixability with pulp or cellulose nanofibers is improved, but the strength of the fibers themselves is lowered. Therefore, there is a possibility that the strength of a resin cannot be improved. Meanwhile, the degree of crystallinity of the microfiber cellulose is preferably 95% or less, more preferably 90% or less, and particularly preferably 85% or less. When the degree of crystallinity exceeds 95%, a ratio of strong hydrogen bonds in a molecule increases, the fibers themselves become rigid, and dispersibility deteriorates.

The degree of crystallinity of the microfiber cellulose can be arbitrarily adjusted by, for example, selection, a pretreatment, or a micronization treatment of a raw material pulp.

The microfiber cellulose has a pulp viscosity of preferably 2 cps or more, more preferably 4 cps or more. When the pulp viscosity of the microfiber cellulose is less than 2 cps, it may be difficult to suppress aggregation of the microfiber cellulose.

The microfiber cellulose has a freeness of preferably 500 ml or less, more preferably 300 ml or less, particularly preferably 100 ml or less. When the freeness of the microfiber cellulose exceeds 500 ml, the average fiber diameter of the microfiber cellulose exceeds 20 μm, and there is a possibility that a resin strength improving effect cannot be sufficiently obtained.

The microfiber cellulose has a zeta potential of preferably −150 to 20 mV, more preferably −100 to 0 mV, particularly preferably −80 to −10 mV. When the zeta potential is less than −150 mV, compatibility with a resin significantly decreases, and the reinforcing effect may be insufficient. Meanwhile, when the zeta potential exceeds 20 mV, dispersion stability may decrease.

The microfiber cellulose has a water retention degree of preferably 80 to 400%, more preferably 90 to 350%, particularly preferably 100 to 300%. When the water retention degree is less than 80%, the reinforcing effect may be insufficient because the water retention degree is not different from that of the raw material pulp. Meanwhile, when the water retention degree exceeds 400%, a dehydration property tends to be poor, and aggregation easily occurs. In this regard, the water retention degree of the microfiber cellulose can be further lowered because hydroxy groups of the fibers are replaced with carbamate groups, and the dehydrating property and the drying property can be enhanced.

The water retention degree of the microfiber cellulose can be arbitrarily adjusted by, for example, selection, a pretreatment, or defibration of a raw material pulp.

The microfiber cellulose has a carbamate group. It is not particularly limited how the microfiber cellulose obtains a carbamate group. For example, the microfiber cellulose may obtain a carbamate group by carbamating the cellulose raw material, or may obtain a carbamate group by carbamating a microfiber cellulose (cellulose raw material that has been made finer).

Note that the term "having a carbamate group" means a state in which a carbamate group is introduced into a fibrous cellulose (ester of carbamic acid). The carbamate group is a group represented by —O—CO—NH—, and is, for example, a group represented by —O—CO—$NH_2$, —O—CONHR, or —O—CO—$NR_2$. That is, the carbamate group can be represented by the following structural formula (1).

[Chemical formula 1]

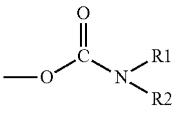

In which, Rs each independently represent at least any one of a saturated straight chain hydrocarbon group, a saturated branched hydrocarbon group, a saturated cyclic hydrocarbon group, an unsaturated straight chain hydrocarbon group, an unsaturated branched hydrocarbon group, an aromatic group, and a derivative group thereof.

Examples of the saturated straight chain hydrocarbon group include a straight chain alkyl group having 1 to 10 carbon atoms, such as a methyl group, an ethyl group, or a propyl group.

Examples of the saturated branched hydrocarbon group include a branched alkyl group having 3 to 10 carbon atoms, such as an isopropyl group, a sec-butyl group, an isobutyl group, or a tert-butyl group.

Examples of the saturated cyclic hydrocarbon group include a cycloalkyl group such as a cyclopentyl group, a cyclohexyl group, or a norbornyl group.

Examples of the unsaturated straight chain hydrocarbon group include a straight chain alkenyl group having 2 to 10 carbon atoms, such as an ethenyl group, a propen-1-yl group, or a propen-3-yl group, and a straight chain alkynyl group having 2 to 10 carbon atoms, such as an ethynyl group, a propyn-1-yl group, or a propyn-3-yl group.

Examples of the unsaturated branched hydrocarbon group include a branched alkenyl group having 3 to 10 carbon atoms, such as a propen-2-yl group, a buten-2-yl group, or a buten-3-yl group, and a branched alkynyl group having 4 to 10 carbon atoms, such as a butyn-3-yl group.

Examples of the aromatic group include a phenyl group, a tolyl group, a xylyl group, and a naphthyl group.

Examples of the derivative group include a group in which one or more hydrogen atoms of the saturated straight chain hydrocarbon group, the saturated branched hydrocarbon group, the saturated cyclic hydrocarbon group, the unsaturated straight chain hydrocarbon group, the unsaturated branched hydrocarbon group, and the aromatic group are replaced with substituents (for example, a hydroxy group, a carboxy group, a halogen atom, and the like).

In a microfiber cellulose having a carbamate group (into which a carbamate group has been introduced), a part or all of hydroxy groups having high polarity are replaced with carbamate groups having relatively low polarity. Therefore, the microfiber cellulose having a carbamate group has low hydrophilicity and high affinity with a resin or the like having low polarity. As a result, the microfiber cellulose having a carbamate group is excellent in uniform dispersibility with a resin. A slurry of the microfiber cellulose having a carbamate group has low viscosity and a good handling property.

A replacement ratio with a carbamate group to a hydroxy group of the microfiber cellulose is preferably 1.0 to 5.0 mmol/g, more preferably 1.2 to 3.0 mmol/g, and particularly preferably 1.5 to 2.0 mmol/g. When the replacement ratio is 1.0 mmol/g or more, an effect of introducing a carbamate group, particularly an effect of improving flexural modulus of a resin is reliably exhibited. Meanwhile, when the replacement ratio exceeds 5.0 mmol/g, the cellulose fibers cannot maintain the shapes of the fibers, and there is a possibility that the resin reinforcing effect cannot be sufficiently obtained. In addition, when the replacement ratio with a carbamate group exceeds 2.0 mmol/g, the average fiber length of the pulp is shortened in a case where the raw material pulp is carbamated. As a result, the average fiber length of the microfiber cellulose is less than 0.1 mm, and there is a possibility that a sufficient resin reinforcing effect cannot be exhibited.

In the present embodiment, the replacement ratio with a carbamate group (mmol/g) refers to the amount of carbamate groups contained in 1 g of the cellulose raw material having a carbamate group. The replacement ratio with a carbamate group is determined by measuring N atoms present in the carbamated pulp by a Kjeldahl method, and calculating a carbamation ratio per unit weight. The cellulose is a polymer having anhydroglucose as a structural unit, and has three hydroxy groups per structural unit.

<Carbamation>

For introducing a carbamate group (carbamation) into a microfiber cellulose (a cellulose raw material in a case where carbamation is performed before defibration, hereinafter, the same applies, and the microfiber cellulose is also referred to as "microfiber cellulose or the like"), as described above, there are a method for carbamating a cellulose raw material and then making the carbamated cellulose raw material finer and a method for making a cellulose raw material finer and then carbamating the finer cellulose raw material. In this regard, in the present specification, defibration of the cellulose raw material is described first, and then carbamation (modification) is described. However, either defibration or carbamation can be performed first. However, preferably, carbamation is performed first, and then defibration is performed. This is because the cellulose raw material before dehydration has high dehydration efficiency, and the cellulose raw material becomes easily defibrated by being heated for carbamation.

The step of carbamating microfiber cellulose or the like can be mainly divided into, for example, a mixing treatment, a removal treatment, and a heat treatment. Note that the mixing treatment and the removal treatment can also be collectively referred to as an adjustment treatment for preparing a mixture to be subjected to the heat treatment.

In the mixing treatment, microfiber cellulose or the like (which may be a cellulose raw material as described above, hereinafter, the same applies) and urea or a derivative of urea (hereinafter, also simply referred to as "urea or the like") are mixed in a dispersion medium.

Examples of urea and a derivative of urea include urea, thiourea, biuret, phenylurea, benzylurea, dimethylurea, diethylurea, tetramethylurea, and a compound in which a hydrogen atom of urea is replaced with an alkyl group. These examples of urea or a derivative of urea can be used singly or in combination of two or more kinds thereof. However, urea is preferably used.

A lower limit of a mixing mass ratio of urea or the like to microfiber cellulose or the like (urea or the like/microfiber cellulose or the like) is preferably 10/100 and more preferably 20/100. Meanwhile, an upper limit thereof is preferably 300/100 and more preferably 200/100. By setting the mixing mass ratio to 10/100 or more, an efficiency of carbamation is improved. Meanwhile, even if the mixing mass ratio exceeds 300/100, carbamation reaches a plateau.

The dispersion medium is usually water. However, another dispersion medium such as an alcohol or an ether, or a mixture of water and another dispersion medium may be used.

In the mixing treatment, for example, microfiber cellulose or the like and urea or the like may be added to water, microfiber cellulose or the like may be added to an aqueous solution of urea or the like, or urea or the like may be added to a slurry containing microfiber cellulose or the like. In addition, for uniform mixing, stirring may be performed after addition. Furthermore, the dispersion containing microfiber cellulose or the like and urea or the like may contain another component.

In the removal treatment, the dispersion medium is removed from the dispersion containing microfiber cellulose or the like and urea or the like, obtained in the mixing treatment. By removing the dispersion medium, urea or the like can be efficiently reacted in the subsequent heat treatment.

The dispersion medium is preferably removed by volatilizing the dispersion medium by heating. According to this method, only the dispersion medium can be efficiently removed while the component of urea or the like is left.

A lower limit of a heating temperature in the removal treatment is preferably 50° C., more preferably 70° C., and particularly preferably 90° C. when the dispersion medium is water. By setting the heating temperature to 50° C. or higher, the dispersion medium can be efficiently volatilized (removed). Meanwhile, an upper limit of the heating temperature is preferably 120° C. and more preferably 100° C. When the heating temperature is higher than 120° C., the dispersion medium and urea may react with each other, and urea may be decomposed alone.

Heating time in the removal treatment can be appropriately adjusted according to a solid concentration of the dispersion and the like. Specifically, the heating time is, for example, 6 to 24 hours.

In the heat treatment subsequent to the removal treatment, a mixture of microfiber cellulose or the like and urea or the like is subjected to the heat treatment. In this heat treatment, a part or all of hydroxy groups of microfiber cellulose or the like react with urea or the like to be replaced with carbamate groups. More specifically, when urea or the like is heated, urea or the like is decomposed into isocyanic acid and ammonia as indicated in the following reaction formula (1). Isocyanic acid is very reactive, and forms a carbamate group on a hydroxy group of cellulose, for example, as indicated in the following reaction formula (2).

$$NH_2—CO—NH_2 \rightarrow H—N{=}C{=}O+NH_3 \quad (1)$$

$$\text{Cell-OH}+H—N{=}C{=}O \rightarrow \text{Cell-CO}—NH_2 \quad (2)$$

A lower limit of a heating temperature in the heat treatment is preferably 120° C., more preferably 130° C., particularly preferably equal to or higher than a melting point (about 134° C.) of urea, still more preferably 140° C., and most preferably 150° C. By setting the heating temperature to 120° C. or higher, carbamation is efficiently performed. An upper limit of the heating temperature is preferably 200° C., more preferably 180° C., and particularly preferably 170° C. When the heating temperature exceeds 200° C., microfiber cellulose or the like is decomposed, and the reinforcing effect may be insufficient.

A lower limit of heating time in the heat treatment is preferably one minute, more preferably five minutes, particularly preferably 30 minutes, still more preferably one hour, and most preferably two hours. By setting the heating time to one minute or more, the carbamation can be reliably performed. Meanwhile, an upper limit of the heating time is preferably 15 hours and more preferably 10 hours. When the heating time exceeds 15 hours, it is not economical, and the carbamation can be sufficiently performed in 15 hours.

However, prolonged heating time leads to deterioration of cellulose fibers. Therefore, a pH condition in the heat treatment is important. As the pH, an alkaline condition with a pH of 9 or more is preferable, an alkaline condition with a pH of 9 to 13 is more preferable, and an alkaline condition with a pH of 10 to 12 is particularly preferable. In addition, as a secondary measure, an acidic or neutral condition with a pH of 7 or less is adopted, an acidic or neutral condition with a pH of 3 to 7 is preferably adopted, and an acidic or neutral condition with a pH of 4 to 7 is particularly preferably adopted. Under a neutral condition with a pH of 7 to 8, the average fiber length of the cellulose fibers is shortened, and the resin reinforcing effect may be poor. On the other hand, under an alkaline condition with a pH of 9 or more, the reactivity of the cellulose fibers is enhanced, the reaction with urea or the like is promoted, and the carbamation is efficiently performed. Therefore, the average fiber length of the cellulose fibers can be sufficiently ensured. Meanwhile, under an acidic condition with a pH of 7 or less, the reaction of decomposing urea or the like into isocyanic acid and ammonia proceeds, the reaction with cellulose fibers is promoted, and the carbamation is efficiently performed. Therefore, the average fiber length of the cellulose fibers can be sufficiently ensured. However, if possible, it is preferable to perform the heat treatment under an alkaline condition. This is because acid hydrolysis of cellulose may proceed under an acidic condition.

The pH can be adjusted, for example, by adding an acidic compound (for example, acetic acid or citric acid) or an alkaline compound (for example, sodium hydroxide or calcium hydroxide) to a mixture.

Examples of an apparatus for heating in the heat treatment include a hot air dryer, a paper machine, and a dry pulp machine.

A mixture after the heat treatment may be washed. This washing may be performed with water or the like. By this washing, unreacted and remaining urea or the like can be removed.

(Slurry)

The microfiber cellulose is dispersed in an aqueous medium to be a dispersion (slurry), if necessary. The entire amount of the aqueous medium is particularly preferably water, but an aqueous medium partially containing another liquid having compatibility with water can also be used. Examples of the other liquid include lower alcohols each having 3 or less carbon atoms.

The slurry has a solid concentration of preferably 0.1 to 10.0% by mass, more preferably 0.5 to 5.0% by mass. When the solid concentration is less than 0.1% by mass, excessive energy may be required at the time of dehydration or drying. On the other hand, when the solid concentration exceeds 10.0% by mass, fluidity of the slurry itself decreases, and there is a possibility that the slurry cannot be uniformly mixed when a dispersant is used.

(Acid-Modified Resin)

As described above, acid groups of the acid-modified resin are ionically bonded to a part or all of carbamate groups. This ionic bonding improves the resin reinforcing effect.

Examples of the acid-modified resin include an acid-modified polyolefin resin, an acid-modified epoxy resin, and an acid-modified polystyrene-based elastomer resin. However, an acid-modified polyolefin resin is preferably used. The acid-modified polyolefin resin is a copolymer of an unsaturated carboxylic acid component and a polyolefin component.

As the polyolefin component, for example, one or more selected from polymers of alkenes such as ethylene, propylene, butadiene, and isoprene can be used. However, a polypropylene resin which is a polymer of propylene is preferably used.

As the unsaturated carboxylic acid component, for example, one or more selected from the group consisting of maleic anhydrides, phthalic anhydrides, itaconic anhydrides, citraconic anhydrides, and citric anhydrides can be used.

However, maleic anhydrides are preferably used. That is, a maleic anhydride-modified polypropylene resin is preferably used.

A mixing amount of the acid-modified resin is preferably 0.1 to 1,000 parts by mass, more preferably 1 to 500 parts by mass, and particularly preferably 10 to 200 parts by mass with respect to 100 parts by mass of the microfiber cellulose. In particular, when the acid-modified resin is a maleic anhydride-modified polypropylene resin, the mixing amount is preferably 1 to 200 parts by mass, and more preferably 10 to 100 parts by mass. When the mixing amount of the acid-modified resin is less than 0.1 parts by mass, the strength is not sufficiently improved. Meanwhile, when the mixing amount exceeds 1,000 parts by mass, the acid-modified resin is excessively added, and the strength tends to be lowered.

The maleic anhydride-modified polypropylene has a weight average molecular weight of, for example, 1,000 to 100,000, preferably 3,000 to 50,000.

The maleic anhydride-modified polypropylene has an acid value of preferably 0.5 mgKOH/g or more and 100 mgKOH/g or less, more preferably 1 mgKOH/g or more and 50 mgKOH/g or less.

Furthermore, the acid-modified resin has a melt flow rate (MFR) of preferably 2000 g/10 min (190° C./2.16 kg) or less, more preferably 1500 g/10 min or less, particularly preferably 500 g/10 min or less. When the MFR exceeds 2000 g/10 min, the dispersibility of the cellulose fibers may be deteriorated.

Note that the acid value is measured in accordance with JIS-K2501, and titrated with potassium hydroxide. The MFR is measured in accordance with JIS-K7210, and determined by placing a load of 2.16 kg at 190° C. and measuring the weight of a sample flowing out in 10 minutes.

(Dispersant)

The cellulose raw material or the microfiber cellulose is more preferable when being mixed with a dispersant. As the dispersant, aromatic compounds each having an amine group and/or a hydroxy group and aliphatic compounds each having an amine group and/or a hydroxy group are preferable.

Examples of the aromatic compounds each having an amine group and/or a hydroxy group include anilines, toluidines, trimethylanilines, anisidines, tyramines, histamines, tryptamines, phenols, dibutylhydroxytoluenes, bisphenol A-type compounds, cresols, eugenols, gallic acids, guaiacols, picric acids, phenolphthaleins, serotonins, dopamines, adrenalines, noradrenalines, thymols, tyrosines, salicylic acids, methyl salicylates, anisyl alcohols, salicyl alcohols, sinapyl alcohols, difenidols, diphenylmethanols, cinnamyl alcohols, scopolamines, triptophols, vanillyl alcohols, 3-phenyl-1-propanols, phenethyl alcohols, phenoxyethanols, veratryl alcohols, benzyl alcohols, benzoins, mandelic acids, mandelonitriles, benzoic acids, phthalic acids, isophthalic acids, terephthalic acids, mellitic acids, and cinnamic acids.

Examples of the aliphatic group compounds each having an amine group and/or a hydroxy group include caprylic alcohols, 2-ethylhexanols, pelargonic alcohols, capric alcohols, undecyl alcohols, lauryl alcohols, tridecyl alcohols, myristyl alcohols, pentadecyl alcohols, cetanols, stearyl alcohols, elaidyl alcohols, oleyl alcohols, linoleyl alcohols, methylamines, dimethylamines, trimethylamines, ethylamines, diethylamines, ethylenediamines, triethanolamines, N,N-diisopropylethylamines, tetramethylethylenediamines, hexamethylenediamines, spermidines, spermines, amantadines, formic acids, acetic acids, propionic acids, butyric acids, valeric acids, caproic acids, enanthic acids, caprylic acids, pelargonic acids, capric acids, lauric acids, myristic acids, palmitic acids, margaric acids, stearic acids, oleic acids, linolic acids, linoleic acids, arachidonic acids, eicosapentaenoic acids, docosahexaenoic acids, and sorbic acids.

The dispersant described above blocks hydrogen bonding between cellulose fibers. Therefore, when the microfiber cellulose and a resin are kneaded, the microfiber cellulose is reliably dispersed in the resin. In addition, the dispersant described above also has a role of improving compatibility between the microfiber cellulose and the resin. In this regard, the dispersibility of the microfiber cellulose in the resin is improved.

Note that when the fibrous cellulose and the resin are kneaded, it is conceivable to separately add a compatibilizer (chemical agent). However, mixing the fibrous cellulose and the dispersant (chemical agent) in advance makes cohesion of the chemical agent to the fibrous cellulose more uniform and enhances an effect of improving the compatibility with the resin rather than adding the chemical agent at this stage.

For example, polypropylene has a melting point of 160° C., and therefore the fibrous cellulose and the resin are kneaded at about 180° C. However, when the dispersant (liquid) is added in this state, drying occurs instantaneously. Therefore, there is a method for preparing a masterbatch (composite resin having a high concentration of microfiber cellulose) using a resin having a low melting point, and then adding a normal resin thereto to lower the concentration of the microfiber cellulose. However, the resin having a low melting point generally has low strength. Therefore, according to this method, the strength of the composite resin may be lowered.

A mixing amount of the dispersant is preferably 0.1 to 1,000 parts by mass, more preferably 1 to 500 parts by mass, and particularly preferably 10 to 200 parts by mass with respect to 100 parts by mass of the microfiber cellulose. When the mixing amount of the dispersant is less than 0.1 parts by mass, improvement of the strength of the resin may be insufficient. Meanwhile, when the mixing amount exceeds 1,000 parts by mass, the dispersant is excessively added, and the strength of the resin tends to be lowered.

In this regard, the acid-modified resin described above is intended to improve compatibility by ionic bonding between an acid group and a carbamate group of the microfiber cellulose, thereby enhancing the reinforcing effect. It is considered that since the acid-modified resin has a large molecular weight, the acid-modified resin is easily compatible with the resin, and contributes to improvement in strength. Meanwhile, the dispersant is interposed between hydroxy groups of the molecules of the microfiber cellulose to prevent aggregation, thereby improving dispersibility in the resin. In addition, since the dispersant has a molecular weight smaller than that of the acid-modified resin, the dispersant can enter a narrow space between fibers of the microfiber cellulose which the acid-modified resin cannot enter, and the dispersant plays a role of improving dispersibility and improving strength. The molecular weight of the acid-modified resin is 2 to 2,000 times, and preferably 5 to 1,000 times the molecular weight of the dispersant from the above viewpoint.

This point will be described more specifically. A resin powder is physically interposed among the molecules of the microfiber cellulose to block hydrogen bonding, thereby improving the dispersibility of the microfiber cellulose. On the other hand, an acid group of the acid-modified resin and a carbamate group of the microfiber cellulose are ionically bonded to each other to improve compatibility, thereby increasing the reinforcing effect. In this regard, the point that the dispersant blocks hydrogen bonding among the molecules of the microfiber cellulose is the same, but since the resin powder is on the micrometer order, the resin powder is physically interposed to suppress hydrogen bonding. Therefore, although the dispersing property of the resin powder is lower than that of the dispersant, the resin powder itself is melted to form a matrix. Therefore, the resin powder does not contribute to deterioration of physical properties. On the other hand, since the dispersant is at a molecular level and is extremely small, the dispersant is highly effective in blocking hydrogen bonding so as to cover the microfiber cellulose to improve the dispersibility of the microfiber cellulose. However, there is a possibility that the dispersant remains in the resin and deteriorates physical properties.

(Manufacturing Method)

A mixture of the fibrous cellulose, the acid-modified resin, the dispersant, and the like can be dried and pulverized into a powdered product before being kneaded with the resin. According to this embodiment, it is not necessary to dry the fibrous cellulose at the time of kneading with the resin, and thermal efficiency is good. When the dispersant is mixed in the mixture, there is a low possibility that the fibrous cellulose (microfiber cellulose) is not redispersed even if the mixture is dried.

The mixture is dehydrated into a dehydrated product prior to drying, if necessary. For the dehydration, for example, one or more kinds selected from dehydration apparatuses such as a belt press, a screw press, a filter press, a twin roll, a twin wire former, a valveless filter, a center disk filter, a film treatment apparatus, and a centrifuge can be used.

For drying the mixture, for example, one or more kinds selected from the group consisting of rotary kiln drying, disk drying, air flow drying, medium fluidized drying, spray drying, drum drying, screw conveyor drying, paddle drying, single-screw kneading drying, multi-screw kneading drying, vacuum drying, and stirring drying can be used.

The dried mixture (dried product) is pulverized into a powdered product. The dried product can be pulverized, for example, using one or more kinds selected from the group consisting of a bead mill, a kneader, a disperser, a twist mill, a cut mill, and a hammer mill.

The powdered product has an average particle size of preferably 1 to 10,000 μm, more preferably 10 to 5,000 μm, particularly preferably 100 to 1,000 μm. When the average particle size of the powdered product exceeds 10,000 μm, kneadability with the resin may be poor. Meanwhile, large energy is required to make the average particle size of the powdered product less than 1 μm, which is not economical.

The average particle size of the powdered product can be controlled not only by controlling the degree of pulverization but also by classification using a classification apparatus such as a filter or a cyclone.

The mixture (powdered product) has a bulk specific gravity of preferably 0.03 to 1.0, more preferably 0.04 to 0.9, particularly preferably 0.05 to 0.8. The bulk specific gravity of more than 1.0 means that hydrogen bonding among the molecules of the fibrous cellulose is stronger, and it is not easy to disperse the fibrous cellulose in the resin. Meanwhile, a bulk specific gravity of less than 0.03 is disadvantageous in terms of transportation cost.

The bulk specific gravity is a value measured in accordance with JIS K7365.

The mixture (powdered product) has a moisture percentage of preferably 50% or less, more preferably 30% or less, particularly preferably 10% or less. When the moisture percentage exceeds 50%, energy for kneading with the resin is enormous, which is not economical.

The moisture percentage is a value calculated by the following formula, in which the mass at the time when a sample is held at 105° C. for six hours or more using a constant temperature dryer and no change in mass is observed is taken as the mass after drying.

$$\text{Fiber moisture percentage (\%)}=[(\text{mass before drying}-\text{mass after drying})/\text{mass before drying}]\times 100$$

The dehydrated and dried microfiber cellulose may contain a resin. When the dehydrated and dried microfiber cellulose contains a resin, hydrogen bonding among the molecules of the dehydrated and dried microfiber cellulose is blocked, and dispersibility in the resin during kneading can be improved.

Examples of a form of the resin contained in the dehydrated and dried microfiber cellulose include a powder-like form, a pellet-like form, and a sheet-like form. However, the resin is preferably in a powder-like form (powdered resin).

When the resin is in a powder-like form, the resin powder contained in the dehydrated and dried microfiber cellulose has an average particle size of preferably 1 to 10,000 μm, more preferably 10 to 5,000 μm, particularly preferably 100 to 1,000 μm. When the average particle size exceeds 10,000 μm, there is a possibility that the resin powder cannot be put in a kneading apparatus because of the large particle size. Meanwhile, when the average particle size is less than 1 μm, there is a possibility that hydrogen bonding among the molecules of the microfiber cellulose cannot be blocked because of the fineness. Note that the kind of the resin such as a powdered resin used here may be the same as or different from the kind of the resin (resin as the main raw material) to be kneaded with the microfiber cellulose, but is preferably the same.

The resin powder having an average particle size of 1 to 10,000 μm is preferably mixed in an aqueous dispersion state before dehydration and drying. By mixing the resin powder in an aqueous dispersion state, the resin powder can be uniformly dispersed between fibers of the microfiber cellulose, and the microfiber cellulose can be uniformly dispersed in the composite resin after kneading, further improving the strength properties.

The powdered product (reinforcing material for resin) obtained as described above is kneaded with a resin to obtain a fibrous cellulose composite resin. This kneading can be performed, for example, after mixing a pellet-like resin and a powdered product, or after first melting a resin and adding a powdered product into the melted product. Note that the acid-modified resin, the dispersant, and the like can also be added at this stage.

For the kneading treatment, for example, one or more kinds selected from the group consisting of a single-screw kneader, a multi-screw kneader having two or more screws, a mixing roll, a kneader, a roll mill, a Banbury mixer, a screw press, and a disperser can be used. Among these, a multi-screw kneader having two or more screws is preferably used. Two or more multi-screw kneaders each having two or more screws may be used in parallel or in series.

A temperature of the kneading treatment is equal to or higher than the glass transition point of the resin and varies depending on the kind of resin, but is preferably 80 to 280° C., more preferably 90 to 260° C., and particularly preferably 100 to 240° C.

As the resin, at least one of a thermoplastic resin and a thermosetting resin can be used.

As the thermoplastic resin, for example, one or more kinds selected from the group consisting of a polyolefin such as polypropylene (PP) or polyethylene (PE), a polyester resin such as an aliphatic polyester resin or an aromatic polyester resin, a polyacrylic resin such as polystyrene, methacrylate, or acrylate, a polyamide resin, a polycarbonate resin, and a polyacetal resin can be used.

However, at least one of a polyolefin and a polyester resin is preferably used. As the polyolefin, polypropylene is preferably used. Furthermore, examples of the polyester resin include an aliphatic polyester resin such as polylactic acid or polycaprolactone, and an aromatic polyester resin such as polyethylene terephthalate. However, a biodegradable polyester resin (also referred to simply as "biodegradable resin") is preferably used.

As the biodegradable resin, for example, one or more kinds selected from the group consisting of a hydroxycarboxylic acid-based aliphatic polyester, a caprolactone-based aliphatic polyester, and a dibasic acid polyester can be used.

As the hydroxycarboxylic acid-based aliphatic polyester, for example, one or more kinds selected from the group consisting of a homopolymer of a hydroxycarboxylic acid such as lactic acid, malic acid, glucose acid, or 3-hydroxybutyric acid, and a copolymer using at least one of these hydroxycarboxylic acids can be used. However, polylactic acid, a copolymer of lactic acid and any of the above hydroxycarboxylic acids other than lactic acid, polycaprolactone, and a copolymer of at least one of the above hydroxycarboxylic acids and caprolactone are preferably used, and polylactic acid is particularly preferably used.

As this lactic acid, for example, L-lactic acid, D-lactic acid, and the like can be used, and these lactic acids may be used singly or in combination of two or more kinds thereof.

As the caprolactone-based aliphatic polyester, for example, one or more kinds selected from the group consisting of a homopolymer of polycaprolactone and a copolymer of polycaprolactone or the like and the above hydroxycarboxylic acid can be used.

As the dibasic acid polyester, for example, one or more kinds selected from the group consisting of polybutylene succinate, polyethylene succinate, and polybutylene adipate can be used.

The biodegradable resin may be used singly or in combination of two or more kinds thereof.

Examples of the thermosetting resin include a phenol resin, a urea resin, a melamine resin, a furan resin, an unsaturated polyester, a diallyl phthalate resin, a vinyl ester resin, an epoxy resin, a polyurethane-based resin, a silicone resin, and a thermosetting polyimide-based resin. These resins can be used singly or in combination of two or more kinds thereof.

The resin may contain an inorganic filler preferably at a ratio that does not interfere with thermal recycling.

Examples of the inorganic filler include a simple substance of a metal element belonging to Group I to Group VIII of the Periodic Table, such as Fe, Na, K, Cu, Mg, Ca, Zn, Ba, Al, Ti, or a silicon element, an oxide thereof, a hydroxide thereof, a carbonate thereof, a sulfate thereof, a silicate thereof, a sulfite thereof, and various clay minerals formed of these compounds.

Specific examples thereof include barium sulfate, calcium sulfate, magnesium sulfate, sodium sulfate, calcium sulfite, zinc oxide, silica, heavy calcium carbonate, light calcium carbonate, aluminum borate, alumina, iron oxide, calcium titanate, aluminum hydroxide, magnesium hydroxide, calcium hydroxide, sodium hydroxide, magnesium carbonate, calcium silicate, clay wollastonite, glass beads, glass powder, silica sand, silica stone, quartz powder, diatomaceous earth, white carbon, and glass fiber. A plurality of these inorganic fillers may be contained. An inorganic filler contained in a de-inked pulp may be used.

A blending ratio between the fibrous cellulose and the resin is preferably fibrous cellulose:resin=1 part by mass or more:99 parts by mass or less, more preferably 2 parts by mass or more:98 parts by mass or less, and particularly preferably 3 parts by mass or more:97 parts by mass or less. The blending ratio between the fibrous cellulose and the resin is preferably fibrous cellulose:resin=50 parts by mass or less:50 parts by mass or more, more preferably 40 parts by mass or less:60 parts by mass or more, and particularly preferably 30 parts by mass or less:70 parts by mass or more. In particular, when the blending ratio of the fibrous cellulose is 10 to 50 parts by mass, the strength of a resin composition, particularly the bending strength thereof and the tensile elastic modulus strength thereof can be significantly improved.

Note that the content ratio between the fibrous cellulose and the resin contained in a finally obtained resin composition is usually the same as the above blending ratio between the fibrous cellulose and the resin.

A difference in solubility parameter $(cal/cm^3)^{1/2}$ (SP value) between the microfiber cellulose and the resin can be represented by difference in SP value=$SP_{MFC}$ value−$SP_{POL}$ value, in which the $SP_{MFC}$ value represents an SP value of the microfiber cellulose, and the $SP_{POL}$ value represents an SP value of the resin. The difference in SP value is preferably 10 to 0.1, more preferably 8 to 0.5, and particularly preferably 5 to 1. When the difference in SP value exceeds 10, there is a possibility that the microfiber cellulose is not dispersed in the resin, and the reinforcing effect cannot be obtained. Meanwhile, when the difference in SP value is less than 0.1, the microfiber cellulose is dissolved in the resin and does not function as a filler, and the reinforcing effect cannot be obtained. In this regard, the smaller the difference between the $SP_{POL}$ value of the resin (solvent) and the $SP_{MFC}$ value of the microfiber cellulose (solute), the larger the reinforcing effect.

Note that the solubility parameter $(cal/cm^3)^{1/2}$ (SP value) is a measure of an intermolecular force acting between a solvent and a solute, and a solvent and a solute having closer SP values have higher solubility.

(Molding Treatment)

The kneaded product of the fibrous cellulose and the resin is, for example, kneaded again if necessary, and then can be molded into a desired shape. The size, thickness, shape, and the like of the molded product are not particularly limited, and can be, for example, a sheet-like shape, a pellet-like shape, a powder-like shape, or a fibrous shape.

A temperature during the molding treatment is equal to or higher than the glass transition point of the resin, and varies depending on the type of the resin, but is, for example, 90 to 260° C., and preferably 100 to 240° C.

The kneaded product can be molded by, for example, mold molding, injection molding, extrusion molding, hollow molding, or foam molding. The kneaded product can be spun into a fibrous shape and mixed with the above-described plant material or the like, and the mixed product is molded into a mat shape or a board shape. Mixing can be performed by, for example, a method for simultaneously depositing the kneaded product and the plant material or the like by air-lay.

As an apparatus for molding the kneaded product, for example, one or more kinds selected from the group consisting of an injection molding machine, a flowing molding machine, a hollow molding machine, a blow molding machine, a compression molding machine, an extrusion molding machine, a vacuum molding machine, and a pressure molding machine can be used.

The above molding can be performed following kneading, or can be performed by once cooling the kneaded product, forming the kneaded product into chips using a crusher or the like, and then putting the chips into a molding machine such as an extrusion molding machine or an injection molding machine. Of course, molding is not an essential requirement of the present invention.

A standard deviation of the flexural modulus of the fibrous cellulose composite resin obtained as described above is preferably 30 MPa or less, more preferably 29 MPa or less, and particularly preferably 28 MPa or less. When the standard deviation exceeds 30 MPa, in a case of use as a material, in order to maintain minimum required physical properties in consideration of variations, it is necessary to perform a treatment such as increasing the thickness of the material more than necessary or further using a reinforcing material, and there is a possibility that cost increases accordingly.

In the present embodiment, the flexural modulus is a value measured in accordance with JIS K 7171.

(Other Composition)

The fibrous cellulose may contain cellulose nanofibers together with the microfiber cellulose. The cellulose nanofibers are fine fibers like the microfiber cellulose, and have a role of complementing the microfiber cellulose for improving the strength of the resin. However, if possible, the fibrous cellulose preferably contains only the microfiber cellulose without containing the cellulose nanofibers as fine fibers. Note that the cellulose nanofibers have an average fiber diameter (average fiber width: average of diameters of single fibers) of preferably 4 to 100 nm, more preferably 10 to 80 nm.

The fibrous cellulose may contain pulp. The pulp has a role of significantly improving the dehydration property of a cellulose fiber slurry. However, as in the case of the cellulose nanofibers, the fibrous cellulose most preferably contains no pulp, that is, the content percentage of the pulp is most preferably 0% by mass.

To the resin composition, in addition to the fine fibers, the pulp, and the like, fibers derived from plant materials obtained from various plants such as kenaf, jute hemp, manila hemp, sisal hemp, ganpi, mitsumata, mulberry, banana, pineapple, coconut palm, corn, sugar cane, bagasse, palm, *papyrus*, reed, esparto, *Eulaliopsis binata*, wheat, rice, bamboo, various kinds of softwood (cedar, cypress, and the like), hardwood, and cotton can be added, or the resin composition may contain these fibers.

To the resin composition, for example, one or more kinds selected from the group consisting of an antistatic agent, a flame retardant, an antibacterial agent, a colorant, a radical scavenger, and a foaming agent can be added as long as these do not interfere with the effect of the present invention. These raw materials may be added to the dispersion of the fibrous cellulose, may be added when the fibrous cellulose is kneaded with the resin, may be added to a kneaded product thereof, or may be added by another method. However, these raw materials are preferably added when the fibrous cellulose is kneaded with the resin from a viewpoint of manufacturing efficiency.

The resin composition may contain an ethylene-α-olefin copolymer elastomer or a styrene-butadiene block copolymer as a rubber component. Examples of the α-olefin include butene, isobutene, pentene, hexene, methyl-pentene, octene, decene, and dodecene.

(Definition, Measurement Method, and the Like)

(Average Fiber Diameter)

A method for measuring the average fiber diameter of the fine fibers (microfiber cellulose and cellulose nanofibers) is as follows.

First, 100 ml of an aqueous dispersion of fine fibers having a solid concentration of 0.01 to 0.1% by mass is filtered through a Teflon (registered trademark) membrane filter, and solvent substitution is performed once with 100 ml of ethanol and three times with 20 ml of t-butanol. Next, the resulting product is lyophilized and coated with osmium to obtain a sample. This sample is observed with an electron microscope SEM image at any magnification of 3,000 to 30,000 depending on the width of a fiber constituting the sample. Specifically, two diagonals are drawn on the observation image, and three straight lines passing an intersection of the diagonals are arbitrarily drawn. Furthermore, the widths of 100 fibers in total intersecting with the three straight lines are visually measured. Then, a median diameter of the measured values is taken as an average fiber diameter.

(Aspect Ratio)

The aspect ratio is a value obtained by dividing an average fiber length by an average fiber width. It is considered that a larger aspect ratio makes the number of caught portions to improve the reinforcing effect, but reduces ductility of the resin because of the many caught portions.

(Water Retention Degree)

The water retention degree is a value measured in accordance with JAPAN TAPPI No. 26 (2000).

(Fiber Analysis)

The fine ratio, the percentage of fibrillation, the average fiber length, and the like are values measured with a fiber analyzer "FS5" manufactured by Valmet K.K.

(Degree of Crystallinity)

The degree of crystallinity is a value measured in accordance with JIS K 0131 (1996).

(Viscosity)

The pulp viscosity is a value measured in accordance with TAPPI T 230.

(B-Type Viscosity)

The B-type viscosity of the dispersion (solid concentration 1%) is a value measured in accordance with JIS-Z8803 (2011) "Method for measuring viscosity of liquid". The B-type viscosity is a resistance torque when a dispersion is stirred, and a higher B-type viscosity means that more energy is required for stirring.

(Freeness)

The freeness is a value measured in accordance with JIS P8121-2 (2012).

EXAMPLES

Next, Examples of the present invention will be described.

A softwood kraft pulp having a moisture percentage of 10% or less, a urea aqueous solution having a solid concentration of 10%, and each of various pH adjusting solutions were mixed at a ratio presented in Table 1 (mass ratio in terms of solid content, note that the amount of the pH adjusting solution is not presented, and is a small amount (about 0.02 to 0.2 g/urea g) because urea is a weak base). The mixture was dried at 105° C. to obtain a dried product. This dried product was subjected to a heat treatment at 140° C. (reaction temperature) for three hours (reaction time) to obtain a carbamate-modified pulp. The carbamate-modified pulp thus obtained was diluted with distilled water and stirred, and dehydrated and washed twice. The washed carbamate-modified pulp was beaten with a Niagara beater for four hours to obtain a carbamate-modified microfiber cellulose (fibrous cellulose) having a desired fine ratio. A fine ratio, an average fiber length, and the like of the carbamate-modified microfiber cellulose are presented in Table 1.

Then, to 2750 g of an aqueous dispersion of the carbamate-modified microfiber cellulose having a solid concentration of 2% by mass, 27.5 g of maleic anhydride-modified polypropylene and 17.5 g of polypropylene powder were added, and the mixture was heated and dried at 105° C. to obtain a material containing a carbamate-modified microfiber cellulose. The material containing a carbamate-modified microfiber cellulose had a moisture content of less than 20%. The material containing a carbamate-modified microfiber cellulose was kneaded with a twin-screw kneader under a condition of 180° C. and 200 rpm to obtain a carbamate-modified microfiber cellulose composite resin having a fiber blending ratio of 55%.

Furthermore, polypropylene pellets were added to and mixed with the carbamate-modified microfiber cellulose composite resin such that carbamate-modified microfiber cellulose:other components=10:90, and the resulting mixture was kneaded with a twin-screw kneader under a condition of 180° C. and 200 rpm to obtain a carbamate-modified microfiber cellulose composite resin having a fiber blending ratio of 10%. This carbamate-modified microfiber cellulose composite resin having a fiber blending ratio of 10% was cut into a cylindrical shape having a diameter of 2 mm and a length of 2 mm with a pelleter, and injection-molded into a cuboid test piece (length 59 mm, width 9.6 mm, thickness 3.8 mm) at 180° C. A flexural modulus of the molded product and a variation in the flexural modulus are presented in Table 1.

In the bending test, first, the flexural modulus was examined in accordance with JIS K7171:2008. In the Table, a case where the flexural modulus (magnification) of the composite resin was 1.3 times or more while the flexural modulus (1.38 GPa) of the resin itself (blank) was defined as 1 was evaluated as "○", and a case where the flexural modulus (magnification) of the composite resin was less than 1.3 times was evaluated as "x". In addition, the variation in the flexural modulus was evaluated by a standard deviation σ at four points of a test body (composite resin) to be measured. When σ was less than 30, the test body was evaluated as "○", and when σ was 30 or more, the test body was evaluated as "x".

TABLE 1

| Test Example | Pulp g | Urea g | Carbamation ratio (mmol/g) | Average fiber length (mm) | Fine ratio (%) | Flexural modulus — | Standard deviation of flexural modulus — |
|---|---|---|---|---|---|---|---|
| 1 | 5 | 1 | 1.64 | 1.95 | 8.8 | ○ | × |
| 2 | 5 | 1 | 1.64 | 1.68 | 13.3 | ○ | × |
| 3 | 5 | 1 | 1.64 | 1.52 | 15.0 | ○ | × |
| 4 | 5 | 1 | 1.64 | 1.14 | 26.8 | ○ | × |
| 5 | 5 | 1 | 1.64 | 0.95 | 30.8 | ○ | ○ |
| 6 | 5 | 5 | 2.88 | 0.31 | 35.8 | ○ | ○ |
| 7 | 5 | 5 | 2.88 | 0.25 | 46.3 | ○ | ○ |
| 8 | 5 | 5 | 2.88 | 0.20 | 56.9 | ○ | ○ |
| 9 | 5 | 1 | 1.00 | 0.16 | 85.4 | ○ | ○ |
| 10 | 5 | 3 | 2.00 | 0.00 | 100.0 | × | ○ |

Discussion

From Table, it can be seen that even when the fine ratio is less than 30%, the flexural modulus is improved, but the variation in the flexural modulus is large. Therefore, it can be seen that the fine ratio is preferably 30% or more from a viewpoint of the resin reinforcing effect, particularly, prevention of breakage of the resin.

INDUSTRIAL APPLICABILITY

The present invention can be used as a fibrous cellulose, a fibrous cellulose composite resin, and a method for manufacturing the fibrous cellulose. For example, the fibrous cellulose composite resin can be used for an interior material, an exterior material, and a structural material of transportation equipment such as an automobile, a train, a ship, or an airplane; a housing, a structural material, and an internal component of an electrical appliance such as a personal computer, a television, a telephone, or a watch; a housing, a structural material, and an internal component of mobile communication equipment such as a mobile phone; a housing, a structural material, and an internal component of mobile music reproduction equipment, video reproduction equipment, printing equipment, copying equipment, sporting goods, office equipment, and toys; an interior material, an exterior material, and a structural material of a building and furniture; business equipment such as stationery; a package, a container such as a tray, a protection member, and a partition member.

The invention claimed is:

1. A fibrous cellulose having an average fiber width of 0.1 μm or more and having a part or all of hydroxyl groups replaced with carbamate groups, wherein
- a replacement ratio with the carbamate group is 1.0 mmol/g or more,
- a fine ratio is 30.8% or more, and
- an average fiber length is 0.16 to 0.95 mm.

2. The fibrous cellulose recited in claim 1, wherein the fine ratio is 40% or more.

3. The fibrous cellulose recited in claim 1, wherein
- a cellulose raw material serving as a raw material has a fine ratio of 1% or more.

4. A fibrous cellulose composite resin comprising a fibrous cellulose and a resin, wherein
- the fibrous cellulose has an average fiber width of 0.1 μm or more and has a part or all of hydroxyl groups replaced with carbamate groups,
- a replacement ratio with the carbamate group is 1.0 mmol/g or more,
- a fine ratio is 30.8% or more, and
- an average fiber length is 0.16 to 0.95 mm.

5. The fibrous cellulose composite resin recited in claim 4, wherein
- a standard deviation of flexural modulus measured in accordance with JIS K 7171 is 30 MPa or less.

6. A method for manufacturing a fibrous cellulose, the method comprising:
- subjecting a cellulose raw material and at least one of urea and a derivative of urea to a heat treatment to replace a part or all of hydroxyl groups of the cellulose raw material with carbamate groups; and
- defibrating the cellulose raw material within a range in which an average fiber width is 0.1 μm or more, wherein
- the heat treatment is performed such that a replacement ratio with the carbamate group is 1.0 mmol/g or more, the defibration is performed until a fine ratio reaches 30.8% or more, and an average fiber length of the fibrous cellulose is 0.16 to 0.95 mm.

7. The fibrous cellulose recited in claim 2, wherein a cellulose raw material serving as a raw material has a fine ratio of 1% or more.

8. The fibrous cellulose recited in claim 3, wherein the fine ratio of the cellulose raw material is 3 to 20%.

* * * * *